(12) United States Patent
Imamura et al.

(10) Patent No.: US 7,794,357 B2
(45) Date of Patent: Sep. 14, 2010

(54) CONTROL DEVICE FOR POWER TRAIN

(75) Inventors: Tatsuya Imamura, Toyota (JP); Yuji Iwase, Mishima (JP); Atsushi Tabata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 450 days.

(21) Appl. No.: 12/068,948

(22) Filed: Feb. 13, 2008

(65) Prior Publication Data

US 2008/0190676 A1 Aug. 14, 2008

(30) Foreign Application Priority Data

Feb. 14, 2007 (JP) ............................. 2007-033745

(51) Int. Cl.
*B60W 10/08* (2006.01)
(52) U.S. Cl. ................. 477/4; 477/5; 475/5; 180/65.21; 180/65.6; 180/65.7
(58) Field of Classification Search ...................... 477/3, 477/4, 5, 6; 475/5; 180/65.21, 65.225, 65.23, 180/65.235, 65.24, 65.26, 65.6, 65.7
See application file for complete search history.

(56) References Cited

U.S. PATENT DOCUMENTS

| 7,252,619 | B2 * | 8/2007 | Tabata et al. | 477/3 |
| 7,670,258 | B2 * | 3/2010 | Kamada et al. | 477/77 |
| 2006/0003863 | A1 | 1/2006 | Tabata et al. | |
| 2008/0076623 | A1 * | 3/2008 | Tabata et al. | 477/5 |
| 2009/0318261 | A1 * | 12/2009 | Tabata et al. | 477/3 |
| 2010/0151988 | A1 * | 6/2010 | Tabata et al. | 477/3 |

FOREIGN PATENT DOCUMENTS

| JP | 11-217025 A | 8/1999 |
| JP | 2000295709 A | 10/2000 |
| JP | 2001165305 A | 6/2001 |
| JP | 2002078105 A | 3/2002 |
| JP | 2002262408 A | 9/2002 |
| JP | 2002340176 A | 11/2002 |

(Continued)

OTHER PUBLICATIONS

Grewa, T.M., et al., "*Defining the General Motors 2-Mode Hybrid Transmission*," SAE International, pp. 43-52 (2007).

*Primary Examiner*—David D Le
(74) *Attorney, Agent, or Firm*—Kenyon & Kenyon LLP

(57) ABSTRACT

A control device is provided for a power train including: a differential mechanism having a first rotating element linked to a first rotary electric machine, a second rotating element linked to a second rotary electric machine and a third rotating element linked to an internal combustion engine; a switching mechanism that switches between a first state that permits relative rotation of the first, second and third rotating elements, and a second state that prohibits relative rotation thereof; and a transmission mechanism connected to the differential mechanism which transmits torque from the differential mechanism to a wheel. The control device includes: a first control portion that controls the switching mechanism so as to switch between the first and second states; and a second control portion that compensates for an amount of change in the torque transmitted to the wheel when the switching between the two states is performed.

19 Claims, 14 Drawing Sheets

FOREIGN PATENT DOCUMENTS

| | | |
|---|---|---|
| JP | 2005-121180 A | 5/2005 |
| JP | 2005-278387 A | 10/2005 |
| JP | A-2006-9942 | 1/2006 |
| JP | A-2006-22933 | 1/2006 |
| JP | 2007001465 A | 1/2007 |

* cited by examiner

FIG. 3

|  | C0 | C1 | C2 | B0 | B1 | B2 | B3 |
|---|---|---|---|---|---|---|---|
| 1ST | ◎ | ○ | × | × | × | × | ○ |
| 2ND | ◎ | ○ | × | × | × | ○ | × |
| 3RD | ◎ | ○ | × | × | ○ | × | × |
| 4TH | ◎ | ○ | ○ | × | × | × | × |
| 5TH | × | ○ | ○ | ◎ | × | × | × |
| R | × | × | ○ | × | × | × | ○ |
| N | × | × | × | × | × | × | × |

○ ENGAGED
× RELEASED
◎ ENGAGED IN STEPPED SPEED CHANGE STATE, RELEASED IN STEPLESS SPEED CHANGE STATE

|      | C0 | C1 | C2 | B0 | B2 | B3 |
|------|----|----|----|----|----|----|
| 1ST  | ◎  | ○  | ×  | ×  | ×  | ○  |
| 2ND  | ◎  | ○  | ×  | ×  | ○  | ×  |
| 3RD  | ◎  | ○  | ○  | ×  | ×  | ×  |
| 4TH  | ×  | ○  | ○  | ◎  | ×  | ×  |
| R    | ×  | ×  | ○  | ×  | ×  | ○  |
| N    | ×  | ×  | ×  | ×  | ×  | ×  |

○ ENGAGED
× RELEASED
◎ ENGAGED IN STEPPED SPEED CHANGE STATE, RELEASED IN STEPLESS SPEED CHANGE STATE

CONTROL DEVICE FOR POWER TRAIN

INCORPORATION BY REFERENCE

The disclosure of Japanese Patent Application No. 2007-33745 filed on Feb. 14, 2007 including the specification, drawings and abstract is incorporated herein by reference in its entirety.

BACKGROUND OF THE INVENTION

1. Field of the Invention

The invention relates to a control device for a power train and, more particularly, to a technology of compensating the torque transmitted from a power train to a wheel.

2. Description of the Related Art

Hybrid vehicles which have an internal combustion engine and a rotary electric machine as drive sources are known. In such a hybrid vehicle, the internal combustion engine and the rotary electric machine are selectively used in accordance with the state of run of the vehicle. For example, during high-speed running or the like, the vehicle runs by mainly using the internal combustion engine. During intermediate-to-low speed running or the like, the vehicle runs by mainly using the rotary electric machine. One of such hybrid vehicles is equipped with a differential mechanism that functions as a continuously variable transmission by using a rotary electric machine.

Japanese Patent Application Publication No. 2006-22933 (JP-A-2006-22933) discloses a control device for a vehicular driving device equipped with a stepless speed change portion that has a differential mechanism which distributes output of the engine to a first electric motor and to a transmission member, and that also has a second electric motor which is provided on a power transmission path from the transmission member to driving wheels, and that is capable of operating as an electrical continuously variable transmission. This control device includes an engagement device that is provided in a differential mechanism and that switches the stepless speed change portion between a stepless speed change state in which an electrical stepless speed change operation is possible and a stepped speed change state in which an electrical stepless speed change operation is not performed, and a torque reduction control portion that reduces at least one of the output torque of the engine, the output torque of the first electric motor and the output torque of the second electric motor, when the engagement device switches the stepless speed change portion from the stepless speed change state to the stepped speed change state.

According to the control device for a vehicular driving device described in the foregoing patent application publication, when the engagement device is engaged for the switching from the stepless speed change state to the stepped speed change state, at least one of the output torque of the engine, the output torque of the first electric motor and the torque of the second electric motor is reduced by the torque reduction control portion. Therefore, the switch shock involved in the switching from the stepless speed change state to the stepped speed change state is restrained.

However, in the control device described in JP-A-2006-22933, the output torque of the drive source is reduced at the time of the switching from the stepless speed change state to the stepped speed change state. Therefore, if the output torque of the rotary electric machine is insufficient at the time of the switching from the stepless speed change state to the stepped speed change state, the torque transmitted to the wheels, that is, the torque used for the running of the vehicle, declines. As a result, torque becomes discontinuous.

SUMMARY OF THE INVENTION

The invention provides a control device for a power train which maintains the continuity of torque.

A control device for a power train in accordance with a first aspect of the invention is a control device for a power train including a differential mechanism that has a first rotating element linked to a first rotary electric machine, a second rotating element linked to a second rotary electric machine and a third rotating element linked to an internal combustion engine, a switching mechanism that switches the states of the differential mechanism, and a transmission mechanism that is connected to the differential mechanism and that transmits torque input from the differential mechanism to a wheel. This control device includes a first control portion that controls the switching mechanism so as to switch between a first state that permits relative rotation of the first rotating element, the second rotating element and the third rotating element, and a second state that prohibits relative rotation thereof, and a second control portion that compensates for an amount of change in the torque transmitted to the wheel when switching between the first state and the second state is performed.

According to the first aspect, the power train includes a differential mechanism that has a first rotating element linked to a first rotary electric machine, a second rotating element linked to a second rotary electric machine and a third rotating element linked to an internal combustion engine, a switching mechanism that switches, in the differential mechanism, between a first state that permits relative rotation of the first rotating element, the second rotating element and the third rotating element, and a second state that prohibits relative rotation thereof, and a transmission mechanism that is connected to the differential mechanism and that transmits torque input from the differential mechanism to a wheel. The switching mechanism is controlled so as to switch between the first state and the second state (switch from the first state to the second state, or switch from the second state to the first state). At the time of the switching between the first state and the second state, the power train is controlled so as to compensate for the amount of change in the torque transmitted to the wheel. As a result, at the time of the switching between the first state and the second state, the continuity of the torque transmitted to the wheel is maintained. Therefore, a control device for a power train which maintains the continuity of torque is provided.

A control device for a power train in accordance with a second aspect of the invention is a control device for a power train including a differential mechanism that has a first rotating element linked to a first rotary electric machine, a second rotating element linked to a second rotary electric machine and a third rotating element linked to an internal combustion engine, a switching mechanism that switches the states of the differential mechanism, and a transmission mechanism that is connected to the differential mechanism and that transmits torque input from the differential mechanism to a wheel. This control device includes a first control portion that controls the switching mechanism so as to switch between a first state that permits all of the first rotating element, the second rotating element and the third rotating element to rotate and also permits relative rotation of the first rotating element, the second rotating element and the third rotating element and a second state in which at least one of the three rotating elements is fixed, and a second control portion that compensates for an amount of change in the torque transmitted to the wheel when switching between the first state and the second state is performed.

According to the second aspect, the power train includes a differential mechanism that has a first rotating element linked to a first rotary electric machine, a second rotating element linked to a second rotary electric machine and a third rotating element linked to an internal combustion engine, a switching mechanism that switches, in the differential mechanism, between a first state that permits relative rotation of the first rotating element, the second rotating element and the third rotating element, and a second state in which at least one of the three rotating elements is fixed, and a transmission mechanism that is connected to the differential mechanism and that transmits torque input from the differential mechanism to a wheel. The switching mechanism is controlled so as to switch between the first state and the second state (switch from the first state to the second state, or switch from the second state to the first state). At the time of the switching between the first state and the second state, the power train is controlled so as to compensate for the amount of change in the torque transmitted to the wheel. As a result, at the time of the switching between the first state and the second state, the continuity of the torque transmitted to the wheel is maintained. Therefore, a control device for a power train which maintains the continuity of torque is provided.

In the foregoing control device for the power train, the first control portion may control the switching mechanism so as to switch between the first state and the second state, when the torque transmitted to the wheel is a largest.

In this construction, the switching between the first state and the second state is performed, with the torque transmitted to the wheel being the largest. As a result, good acceleration characteristic is obtained.

In the foregoing control device for the power train may further include a torque control portion that causes the torque transmitted to the wheel following the switching between the first state and the second state to be smaller when a compensation amount of the torque transmitted to the wheel is restricted than when the compensation amount is not restricted.

In this construction, when the compensation amount of the torque transmitted to the wheel is restricted, the power train is controlled so that the torque transmitted to the wheel following the switching between the first state and the second state is smaller than when the compensation amount thereof is not restricted. As a result, in the case where the compensation amount of torque is restricted, the amount of torque that is to be delivered to the wheel by the compensation of torque becomes small. Therefore, even in the case where the compensation amount of torque cannot be made large, the continuity of the torque transmitted to the wheel is maintained.

In the foregoing control device for the power train, when the compensation amount of the torque transmitted to the wheel is restricted, the first control portion may control the switching mechanism so as to perform the switching between the first state and the second state, with the torque transmitted to the wheel being different from the torque transmitted to the wheel at a time of the switching between the first state and the second state when the compensation amount is not restricted.

In this construction, when the compensation amount of the torque transmitted to the wheel is restricted, the switching between the first state and the second state is performed, with the torque transmitted to the wheel being different from the torque transmitted to the wheel when the compensation amount is not restricted. For example, the switching between the first state and the second state is performed when the torque transmitted to the wheel is smaller than the torque transmitted the wheel when the compensation amount is not restricted. As a result, the torque transmitted to the wheel at the time point of starting the compensation of torque becomes small, that is, the amount of torque that is to be delivered to the wheel by the compensation of torque becomes small. Therefore, even in the case where the compensation amount of torque cannot be made large, the continuity of the torque transmitted to the wheel is maintained.

In the control device for the power train, when the compensation amount of the torque transmitted to the wheel is restricted, the first control portion may control the switching mechanism so as to perform the switching between the first state and the second state, with the torque transmitted to the wheel being smaller than the torque transmitted to the wheel at a time of the switching between the first state and the second state when the compensation amount is not restricted.

In this construction, when the compensation amount of the torque transmitted to the wheel is restricted, the switching between the first state and the second state is performed, with the torque transmitted to the wheel being smaller than the torque transmitted to the wheel at the time of the switching between the first state and the second state when the compensation amount is not restricted. As a result, the torque transmitted to the wheel at the time point of starting the compensation of torque becomes small, that is, the amount of torque that is to be delivered to the wheel by the compensation of torque becomes small. Therefore, even in the case where the compensation amount of torque cannot be made large, the continuity of the torque transmitted to the wheel is maintained.

In the foregoing control device for the power train, the second control portion may control at least one of the first rotary electric machine and the second rotary electric machine so as to compensate for the amount of change in the torque transmitted to the wheel.

In this construction, at least one of the first rotary electric machine and the second rotary electric machine is controlled so as to compensate for the amount of change in the torque transmitted to the wheel. As a result, torque compensation is carried out by using one or both of the first rotary electric machine and the second rotary electric machine that are good in response regarding torque. Therefore, good continuity of torque is maintained.

The control device for the power train may further include a stepless speed change portion that causes an electrical stepless speed change to be performed on the power train during the first state.

In this construction, the power train is controlled so as to perform the electrical stepless speed change in the first state that permits relative rotation of the first rotating element, the second rotating element and the third rotating element of the differential mechanism. As a result, the speed change ratio of the power train is steplessly changed. Therefore, the torque transmitted to the wheel continuously changes.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a diagram showing an operation table (diagram No. 1 of the kind);

DETAILED DESCRIPTION OF EMBODIMENTS

Figure 1:
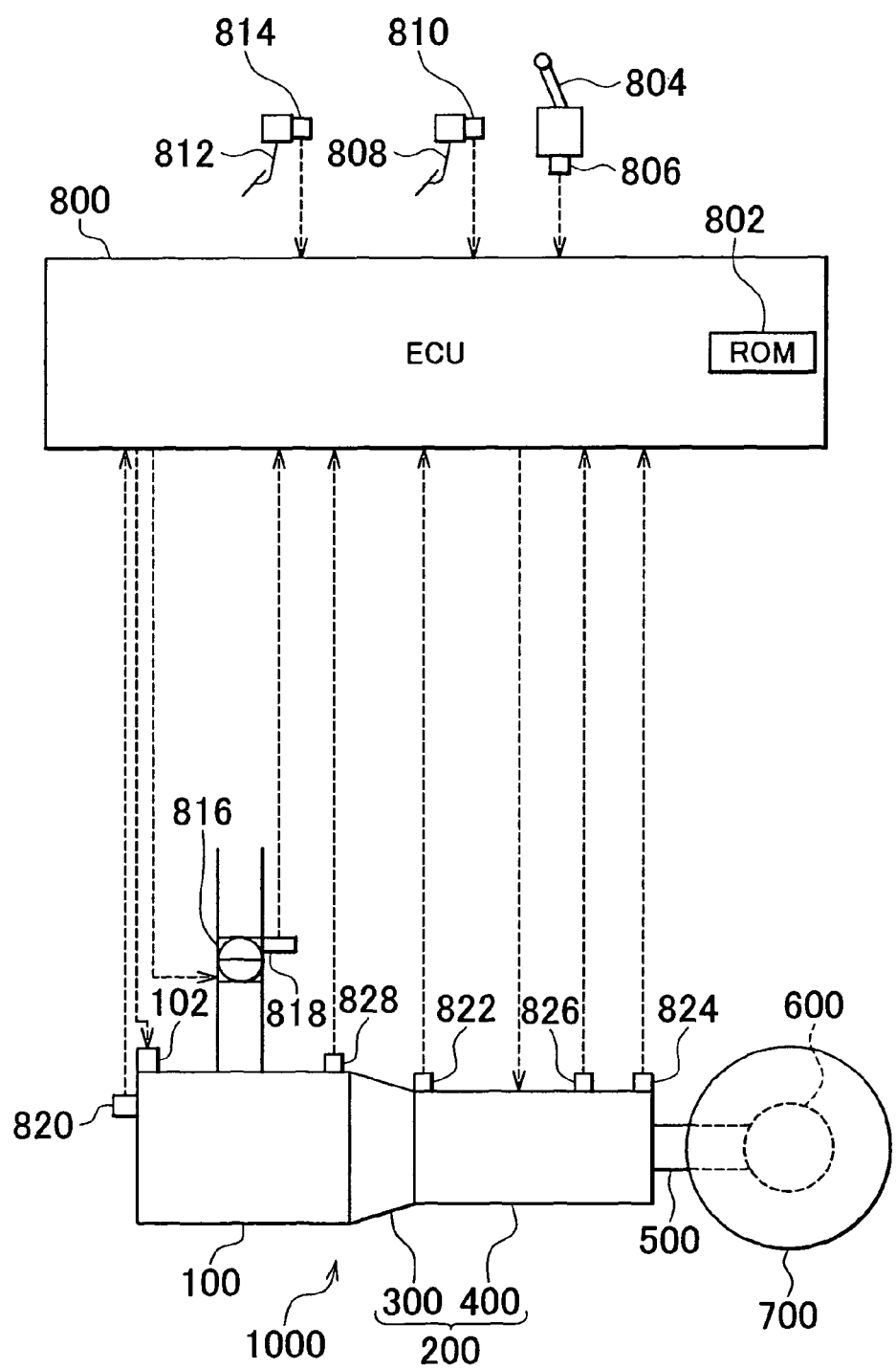
FIG. 1 is a schematic construction diagram showing a hybrid vehicle equipped with a control device in accordance with an embodiment of the invention.

Embodiments of the invention will be described hereinafter with reference to the drawings. In the description below, the same components are assigned with the same reference characters. Their names and functions are also the same. Therefore, detailed descriptions thereof will not be repeated.

With reference to FIG. 1, a hybrid vehicle equipped with a control device in accordance with an embodiment of the invention will be described. This hybrid vehicle is an FR (Front-engine Rear-drive) vehicle. The hybrid vehicle may be other than the FR vehicle.

The hybrid vehicle includes an engine 100, a transmission 200, a propeller shaft 500, a differential gear 600, a rear wheel 700, and an ECU (Electronic Control Unit) 800. The control device in accordance with the embodiment is realized by executing a program recorded in a ROM (Read-Only Memory) 802 of the ECU 800. A power train 1000 controlled by the ECU 800 that is a control device in accordance with the embodiment of the invention includes an engine 100 and the transmission 200.

The engine 100 is an internal combustion engine in which a mixture of air and fuel injected from an injector 102 is combusted in a cylinder. Due to the combustion, a piston within the cylinder is pushed down, so that a crankshaft is rotated.

The transmission 200 is linked to the engine 100. The transmission 200 includes a first speed change portion 300 and a second speed change portion 400 as described below. Torque output from the transmission 200 is transmitted to left and right rear wheels 700 via the propeller shaft 500 and the differential gear 600.

The ECU 800 is connected to a position switch 806 of a shift lever 804, an accelerator operation amount sensor 810 of an accelerator pedal 808, a depression force sensor 814 of a brake pedal 812, a throttle opening degree sensor 818 of an electronic throttle valve 816, an engine rotation speed sensor 820, an input shaft rotation speed sensor 822, an output shaft rotation speed sensor 824, an oil temperature sensor 826, and a water temperature sensor 828, via harnesses or the like.

The position of the shift lever 804 is detected by the position switch 806, and a signal representing a detection result is sent to the ECU 800. Corresponding to the position of the shift lever 804, the speed shifting in the transmission 200 is automatically carried out.

The accelerator operation amount sensor 810 detects the degree of depression of the accelerator pedal 808, and sends a signal representing a detection result to the ECU 800. The depression force sensor 814 detects the depression force on the brake pedal 812 (the driver's depressing force on the brake pedal 812), and sends a signal representing a detection result to the ECU 800.

The throttle opening degree sensor 818 detects the degree of opening of the electronic throttle valve 816 whose degree of opening is adjusted by an actuator, and sends a signal representing a detection result to the ECU 800. Via the electronic throttle valve 816, the amount of air taken into the engine 100 (the output of the engine 100) is adjusted.

Incidentally, instead of or in addition to the electronic throttle valve 816, the amount of air taken into the engine 100 may be adjusted by changing the amount of lift or the opening/closing phase of the intake valves (not shown) or the exhaust valves (not shown).

The engine rotation speed sensor 820 detects the rotation speed of an output shaft (crankshaft) of the engine 100, and sends a signal representing a detection result to the ECU 800. The input shaft rotation speed sensor 822 detects the input shaft rotation speed NI of the second speed change portion 400, and sends a signal representing a detection result to the ECU 800. The output shaft rotation speed sensor 824 detects the output shaft rotation speed NO of the transmission 200 (second speed change portion 400), and sends a signal representing a detection result to the ECU 800.

The oil temperature sensor 826 detects the temperature of an oil (oil temperature) (ATF: Automatic Transmission Fluid) used for the operation and lubrication of the transmission 200, and sends a signal representing a detection result to the ECU 800.

The water temperature sensor 828 detects the temperature of cooling water (water temperature) of the engine 100, and sends a signal representing a detection result to the ECU 800.

The ECU 800 controls appliances and the like so that the vehicle assumes a desired state of run on the basis of signals from the position switch 806, the accelerator operation amount sensor 810, the depression force sensor 814, the throttle opening degree sensor 818, the engine rotation speed sensor 820, the input shaft rotation speed sensor 822, the output shaft rotation speed sensor 824, the oil temperature sensor 826, the water temperature sensor 828, etc. as well as maps and programs stored in the ROM 802.

Figure 2:
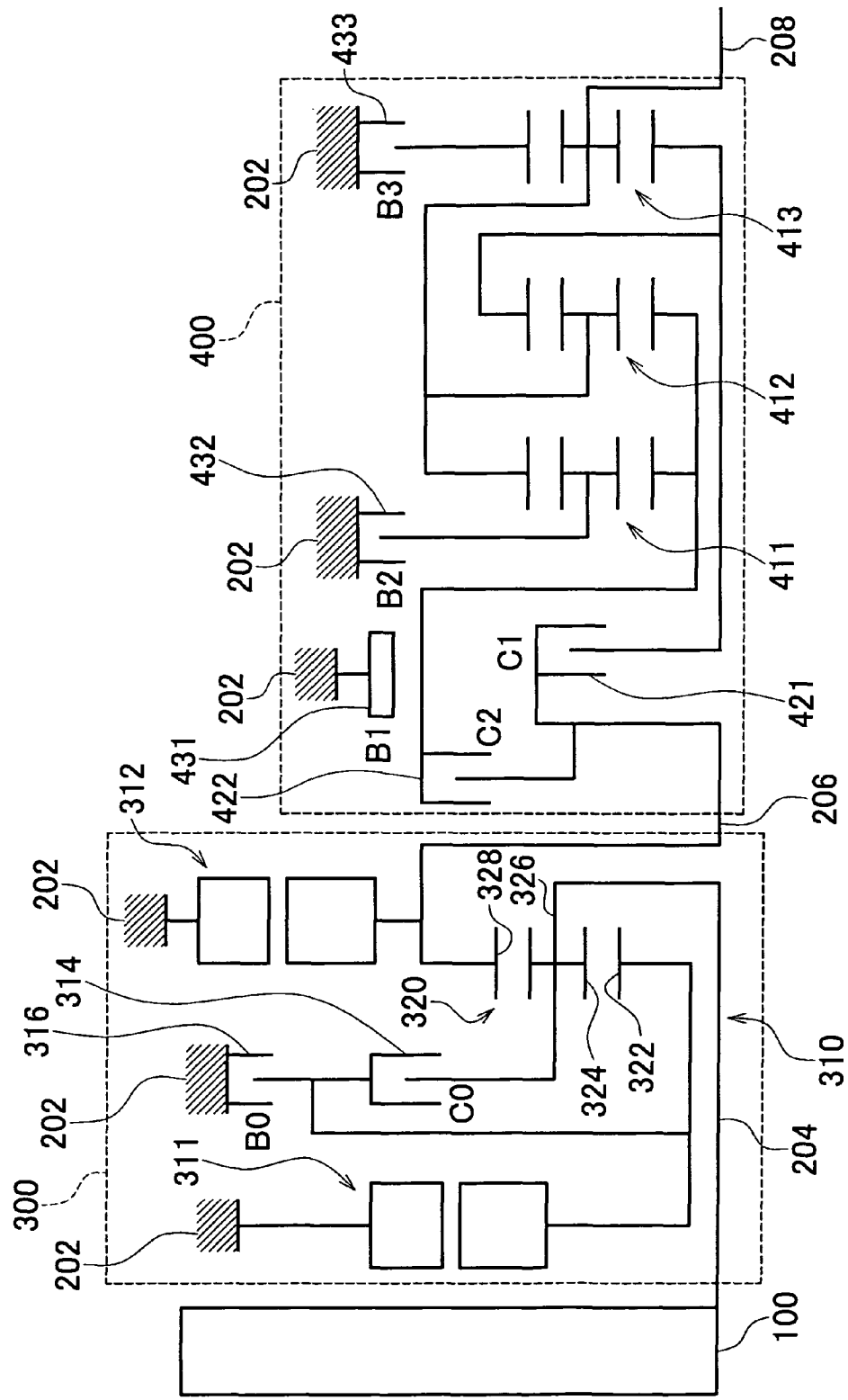
FIG. 2 is a diagram showing a transmission (diagram No. 1 of the kind)

With reference to FIG. 2, the transmission 200 will be further described. The transmission 200 includes an input shaft 204 as an input rotating member disposed on a common center axis within a case 202 as a non-rotating member attached to a vehicle body, a first speed change portion 300 linked to the input shaft 204 directly or via a damper (not shown), a second speed change portion 400 linked in series on the power transmission path between the first speed change portion 300 and the rear wheels 700 via a transmission member (power transmission shaft) 206, and an output shaft 208 as an output rotating member linked to the second speed change portion 400.

Since the transmission 200 is symmetrical with respect to the center axis thereof, a lower part of the transmission 200 is omitted from the illustration in FIG. 2. This is the same with embodiments described below.

The first speed change portion 300 includes a power splitting mechanism 310, a first MG (Motor Generator) 311, and a second MG 312. The first speed change portion 300 further includes two friction engagement elements: a C0 clutch 314 and a B0 brake 316.

The power splitting mechanism 310 splits the output of the engine 100 input to the input shaft 204 to the first MG 311 and the transmission member 206. The power splitting mechanism 310 is constructed of a planetary gear 320.

The planetary gear 320 includes a sun gear 322, pinion gears 324, a carrier 326 supporting the pinion gears 324 rotatably around their own axes and also revolvably, and a ring gear 328 meshing with the sun gear 322 via the pinion gears 324.

In the power splitting mechanism 310, the carrier 326 is linked to the input shaft 204, that is, to the engine 100. The sun gear 322 is linked to the first MG 311. The ring gear 328 is linked to the second MG 312 via the transmission member 206.

The power splitting mechanism 310 functions as a differential device due to the sun gear 322, the carrier 326 and the ring gear 328 rotating relatively to each other. Due to the differential function of the power splitting mechanism 310, the output of the engine 100 is split to the first MG 311 and to the transmission member 206.

As the first MG 311 generates electric power using a portion of the split output of the engine 100, or as the second MG 312 is rotationally driven using the electric power generated by the first MG 311, the power splitting mechanism 310 functions as a continuously variable transmission (electrical continuously variable transmission).

The first MG 311 and the second MG 312 are three-phase alternating-current rotary electric machines. The first MG 311 is linked to the sun gear 322 of the power splitting mechanism 310. The second MG 312 is provided so that its rotor rotates integrally with the transmission member 206.

The first MG 311 and the second MG 312 are controlled, for example, so as to satisfy a target output torque of the transmission 200 calculated from the accelerator operation amount, the vehicle speed, etc., and also realize optimum fuel economy of the engine 100.

The C0 clutch 314 is provided so as to link the sun gear 322 and the carrier 326. The B0 brake 316 is provided so as to link the sun gear 322 to the case 202. Incidentally, it is also permissible to adopt a construction in which the carrier 326 is linked to the case 202 through the use of the B0 brake 316.

The second speed change portion 400 includes three planetary gears 411 to 413 of a single-pinion type, and five friction engagement elements: a C1 clutch 421, a C2 clutch 422, a B1 brake 431, a B2 brake 432, and a B3 brake 433.

By engaging the friction engagement elements of the first speed change portion 300 and the second speed change portion 400 in combinations shown in an operation table shown in FIG. 3, the transmission 200 forms five forward speed gear steps, that is, the first through fifth speed gear steps.

If the C0 clutch 314 and the B0 brake 316 are in a released state, all of the sun gear 322, the carrier 326 and the ring gear 328 are permitted to rotate, and relative rotation thereof is also permitted. In this state, the power splitting mechanism 310 functions as a continuously variable transmission. Specifically, the transmission 200 assumes a stepless speed change state.

If the C0 clutch 314 is in an engaged state, relative rotation of the sun gear 322, the carrier 326 and the ring gear 328 is prohibited. In this state, the power splitting mechanism 310 does not function as a continuously variable transmission. Specifically, in the transmission 200, a stepped speed change state in which the speed change ratio is changed stepwise is assumed.

If the B0 brake 316 is in the engaged state, the sun gear 322 is fixed to the case 202. In this state, the power splitting mechanism 310 does not function as a continuously variable transmission. Specifically, the transmission 200 assumes the stepped speed change state.

Figure 4:
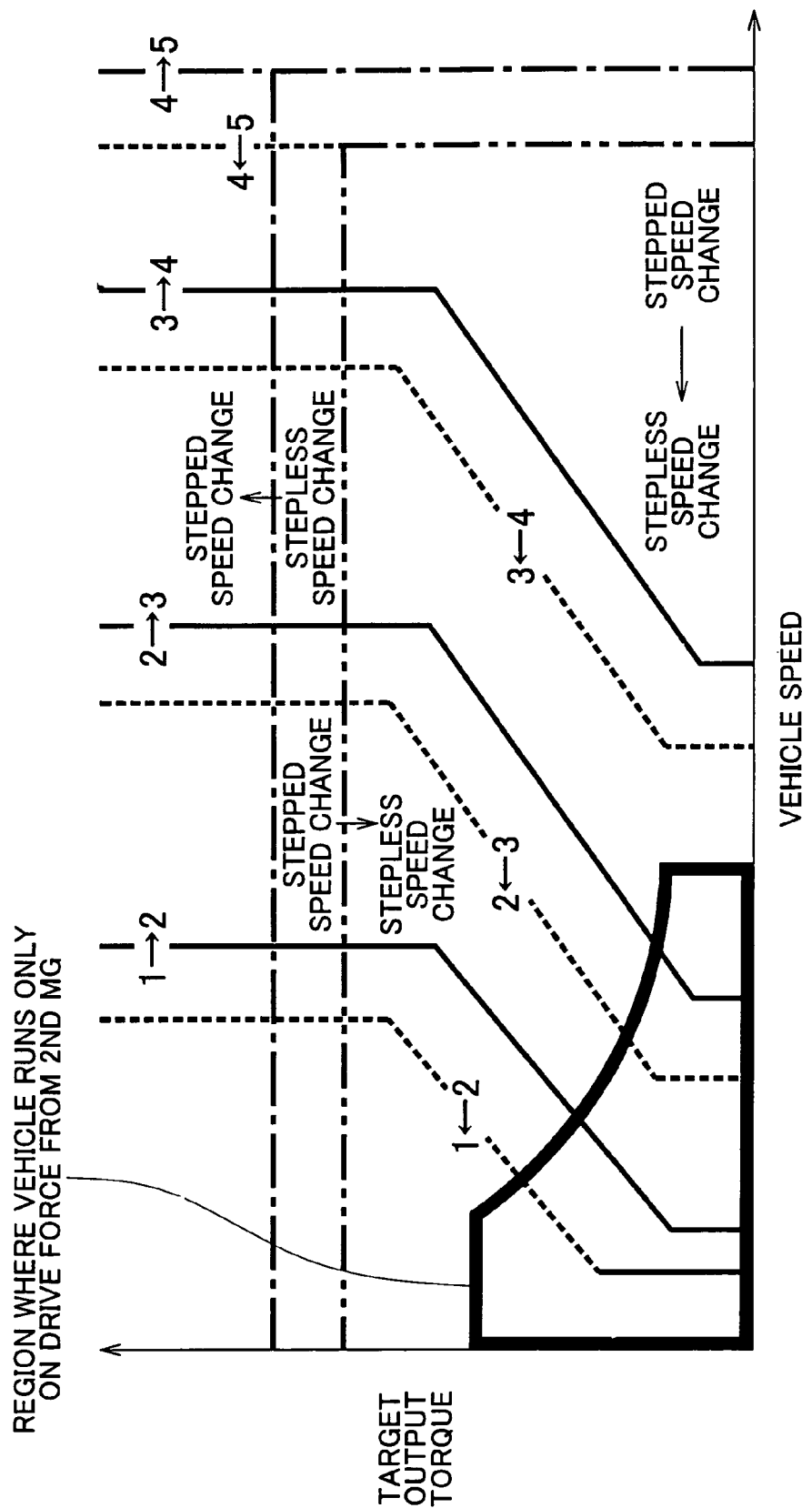
FIG. 4 is a diagram showing a shifting chart.

The speed shifting in the transmission 200 (including the switching between the stepless speed change state and the stepped speed change state) is controlled, for example, on the basis of a shifting chart shown in FIG. 4. The shifting chart in the embodiment is determined by using the vehicle speed and the target output torque calculated from the accelerator operation amount, the vehicle speed, etc. as parameters. Incidentally, the parameters of the shifting chart are not limited so.

In FIG. 4, solid lines are upshift lines, and dashed lines are downshift lines. A region surrounded by a thick solid line represents a region in which the vehicle runs using only the drive force of the second MG 312 without using the drive force from the engine 100. A one-dot chain line in FIG. 4 is a switching line at which the speed change state is switched from the stepless speed change state to the stepped speed change state. A two-dot chain line in FIG. 4 is a switching line at which the speed change state is switched from the stepped speed change state to the stepless speed change state.

Figure 5:
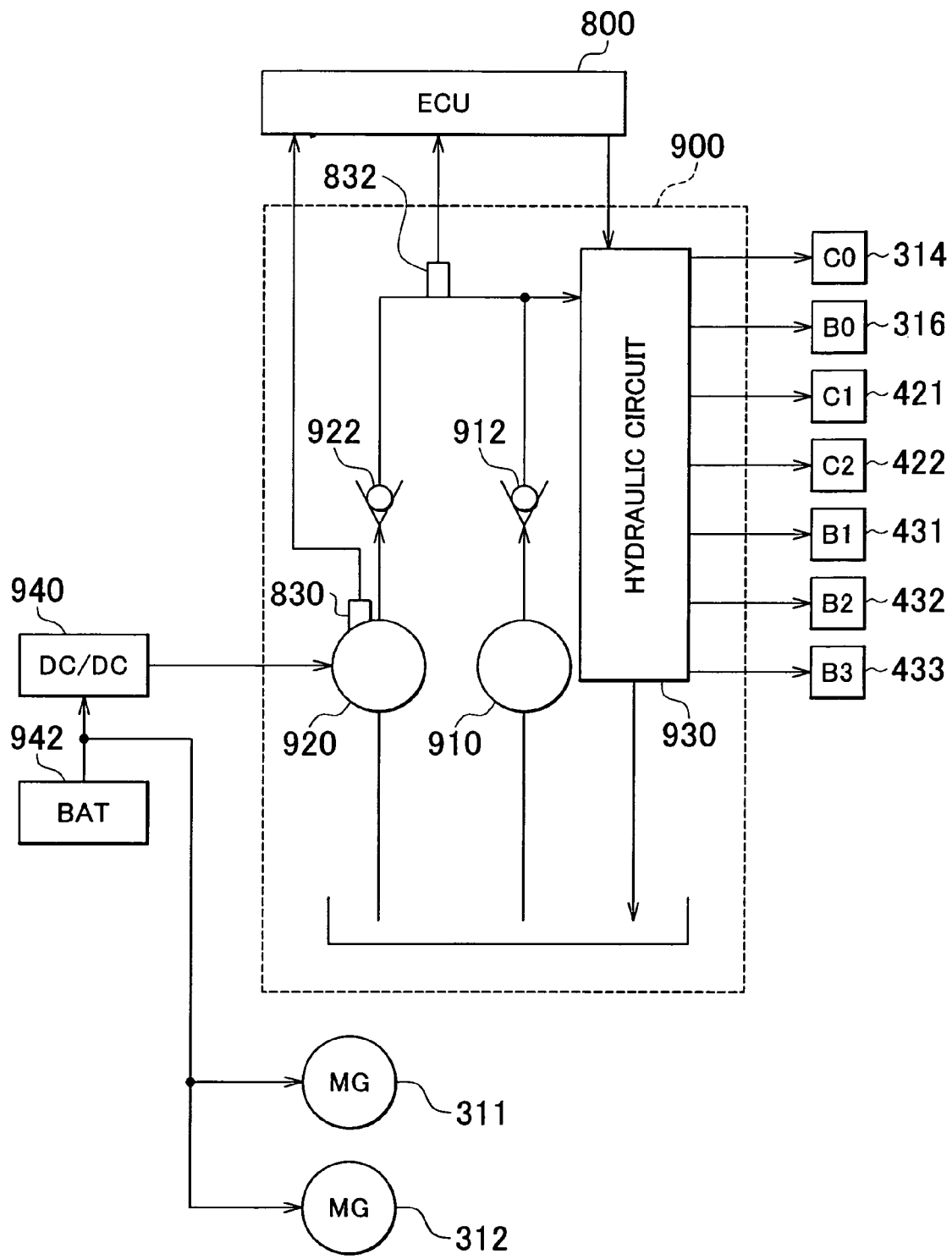
FIG. 5 is a diagram showing a hydraulic control device.

To perform a speed shift, the C0 clutch 314, the B0 brake 316, the C1 clutch 421, the C2 clutch 422, the B1 brake 431, the B2 brake 432, and the B3 brake 433 are operated hydraulically. In this embodiment, the hybrid vehicle is provided with a hydraulic control device 900 as shown in FIG. 5 which controls the engagement and release of the friction engagement elements by supplying and discharging oil pressure with respect to the friction engagement elements.

The hydraulic control device 900 includes an mechanical oil pump 910, an electric oil pump 920, and a hydraulic circuit 930 that regulates the oil pressure generated by the oil pumps 910, 920 to a line pressure, and that supplies and discharges the oil pressure regulated from the line pressure as a basic pressure, and that supplies oil for lubrication to appropriate sites.

The mechanical oil pump 910 is a pump that is driven by the engine 100 to generate oil pressure. The mechanical oil pump 910 is disposed coaxially with the carrier 326, and receives toque from the engine 100 to operate. Specifically, due to rotation of the carrier 326, the mechanical oil pump 910 is driven to generate oil pressure.

On the other hand, the electric oil pump 920 is a pump driven by an electric motor (not shown). The electric oil pump 920 is attached to an appropriate site such as an outside of the case 202. The electric oil pump 920 is controlled by the ECU 800 so as to generate a desired oil pressure. For example, the rotation speed or the like of the electric oil pump 920 is feedback controlled.

The rotation speed of the electric oil pump 920 is detected by a rotation speed sensor 830, and a signal representing a detection result is sent to the ECU 800. Besides, the ejection pressure from the electric oil pump 920 is detected by an oil pressure sensor 832, and a signal representing a detection result is sent to the ECU 800.

The electric oil pump 920 operates on electric power supplied from a battery 942 via a DC/DC converter 940. The electric power of the battery 942 is supplied to the first MG 311 and the second MG 312 as well as the electric oil pump 920.

The hydraulic circuit 930 is provided with solenoid valves, switching valves, or pressure regulating valves (not shown), and controls the pressure regulation and the supply and discharge of oil pressure. That control is performed by the ECU 800.

The ejection side of each oil pump 910, 920 is provided with a check valve 912, 922 that opens at the ejection pressure of a corresponding one of the oil pumps 910, 920 and that closes in the opposite direction. These oil pumps 910, 920 are connected to the hydraulic circuit 930 in parallel with each other. Besides, a line-pressure valve (not shown) that regulates the line pressure controls the line pressure to two states: a state in which the line pressure is made high by increasing the ejection amount, and another state in which the line pressure is made low by decreasing the ejection amount.

Figure 6:
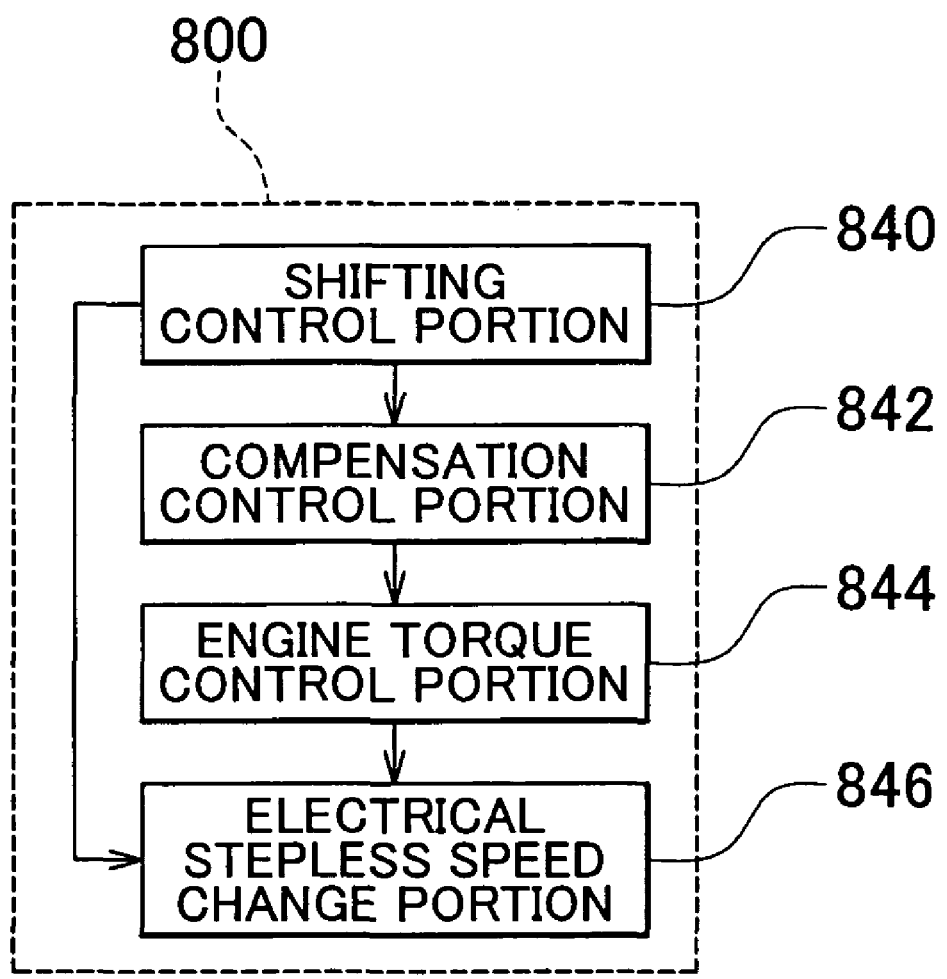
FIG. 6 is a functional block diagram of an ECU.

With reference to FIG. 6, a function of the ECU 800 that is a control device in accordance with this embodiment will be described. Incidentally, the function of the ECU 800 described below may be realized by hardware, and may also be realized by software.

The ECU 800 includes a speed shifting control portion 840, a compensation control portion 842, an engine torque control portion 844, and an electrical stepless speed change portion 846.

The speed shifting control portion 840 controls the transmission 200 so as to perform speed shift on the basis of the aforementioned shifting chart. For example, as shown in FIG. 7, the shifting in which the speed change state is switched from the stepless speed change state to the stepped speed change state is performed at a vehicle speed V(1) at which the torque transmitted to the rear wheels 700 reaches a peak (largest-magnitude state).

Figure 7:
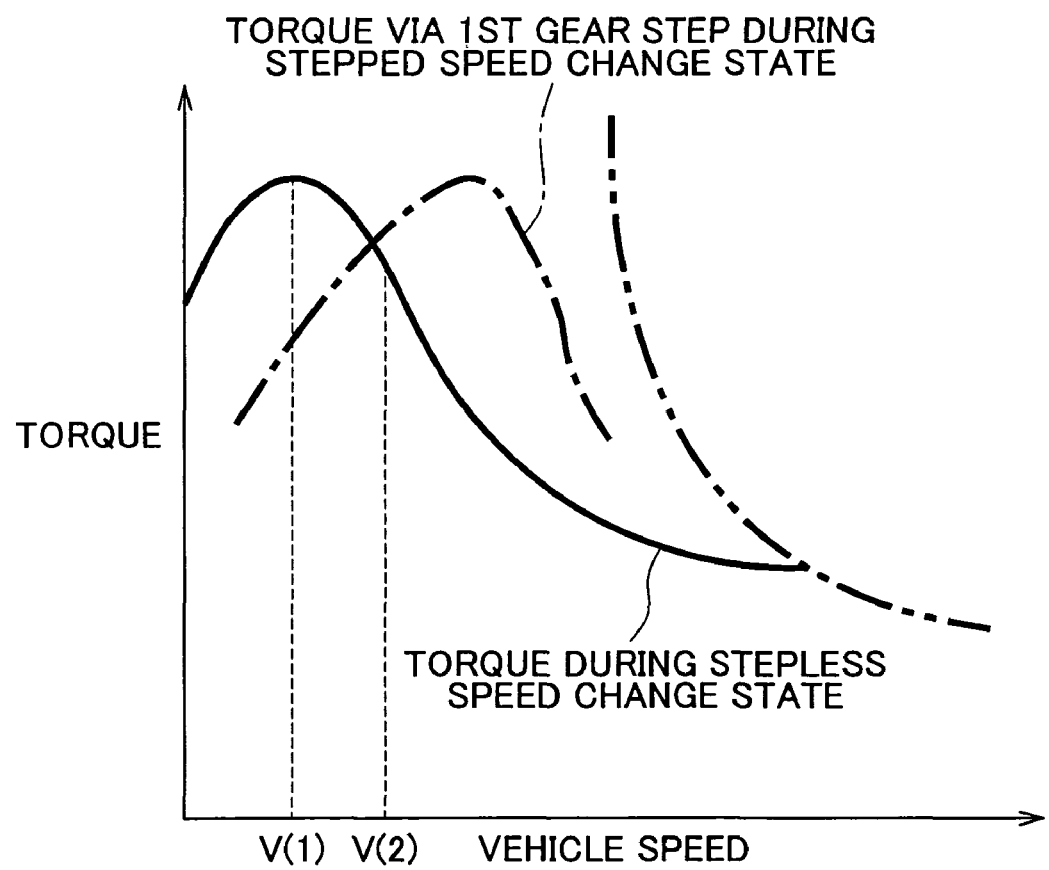
FIG. 7 is a diagram showing the torque transmitted to rear wheels during a stepless speed change state, and the torque transmitted to the rear wheels during a stepped speed change state (diagram No. 1 of the kind)

A solid line in FIG. 7 shows the torque that is transmitted to the rear wheels 700 during the stepless speed change state. A one-dot chain line in FIG. 7 shows the torque that is transmitted to the rear wheels 700 via the first speed gear step in the stepped speed change state when there is no torque assist given by the first MG 311 or the second MG 312. That is, the one-dot chain line in FIG. 7 shows the torque that is transmitted only from the engine 100 to the rear wheels 700 via the first speed gear step in the stepped speed change state. A two-dot chain line in FIG. 7 shows the torque that provides an output of, for example, 200 kw.

Furthermore, the speed shifting control portion 840 controls the transmission 200 so that in the case where the output torque of the first MG 311 and the second MG 312 are being restricted, the shifting is performed with a smaller torque transmitted from the transmission 200 to the rear wheels 700 than in the case where the output torque of the first MG 311 and the second MG 312 are not being restricted. For example, as shown in FIG. 7, the shifting in which the speed change state is switched from the stepless speed change state to the stepped speed change state is performed at a vehicle speed V(2) at which the torque is lower than at the vehicle speed V(1).

The torque at the vehicle speed V(2) at which the shifting is performed, that is, at the time point at which the shift is started, in the case where the output torque of the first MG 311 and the second MG 312 is being restricted is determined in accordance with the degree of the restriction of the output torque of the first MG 311 and the second MG 312.

For example, in the case of small degree of the restriction of the output torque of the first MG 311 and the second MG 312, the shifting is performed at a vehicle speed that corresponds to a higher torque than in the case of large degree of the restriction thereof. That is, the shifting is performed at a vehicle speed that corresponds to the higher torque the larger the maximum value of the torque that the first MG 311 and the second MG 312 are allowed to output.

In the case where the discharge from the battery 942 is restricted or where the first MG 311 and the second MG 312 are in a predetermined state, the output torque of the first MG 311 and the second MG 312 is restricted.

Figure 8:
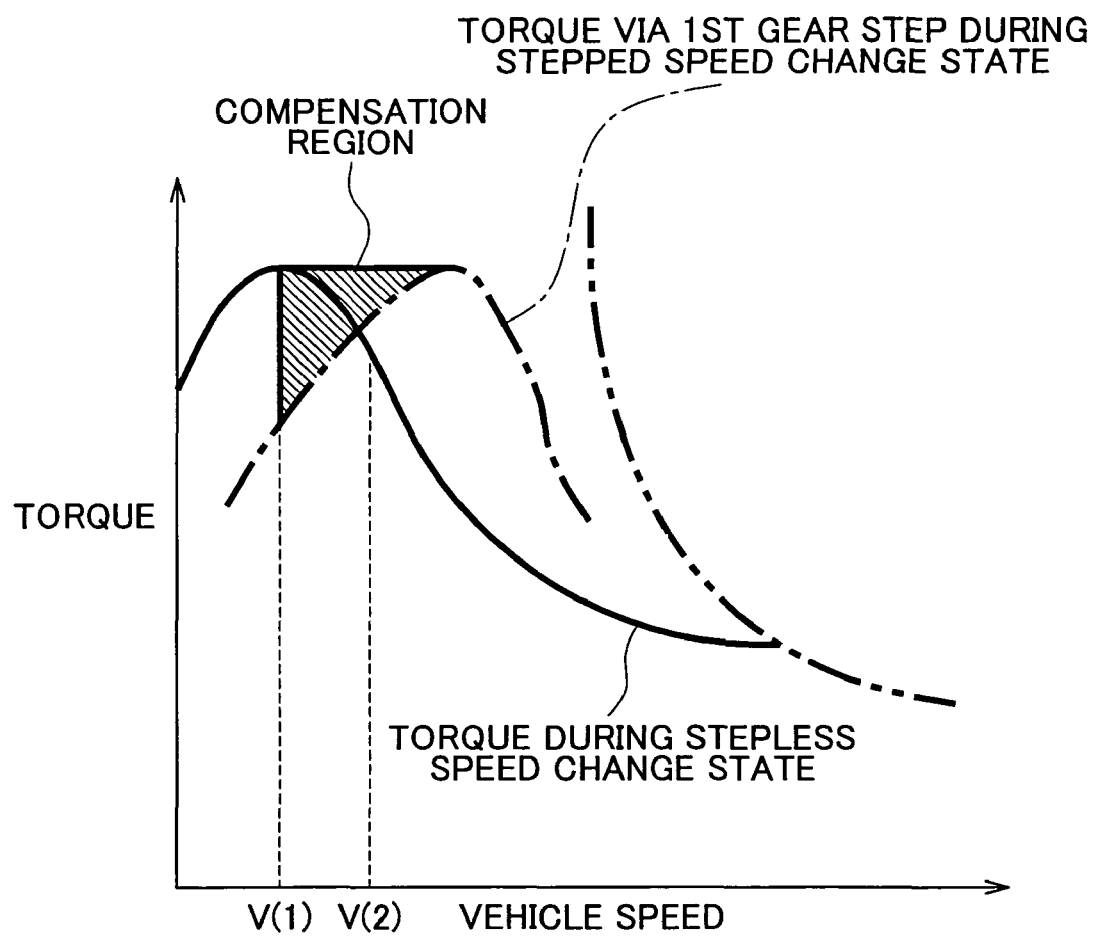
FIG. 8 is a diagram showing the torque transmitted to the rear wheels during a stepless speed change state, and the torque transmitted to the rear wheels during a stepped speed change state (diagram No. 2 of the kind)

The compensation control portion 842 controls the first MG 311 or the second MG 312 so as to compensate the amount of change in the torque transmitted to the rear wheels 700, at the time of the shifting. For example, as shown in FIG. 8, the torque is compensated so that the torque transmitted to the rear wheels 700 following the shifting becomes equal to the torque transmitted to the rear wheels 700 prior to the shifting.

The engine torque control portion 844 controls the engine 100 so that in the case where the output torque of the first MG 311 and the second MG 312 is restricted, that is, in the case where the compensation amount of torque is restricted, the torque transmitted from the transmission 200 to the rear wheels 700 following the shifting is smaller than in the case where the compensation amount of torque is not restricted.

Figure 9:
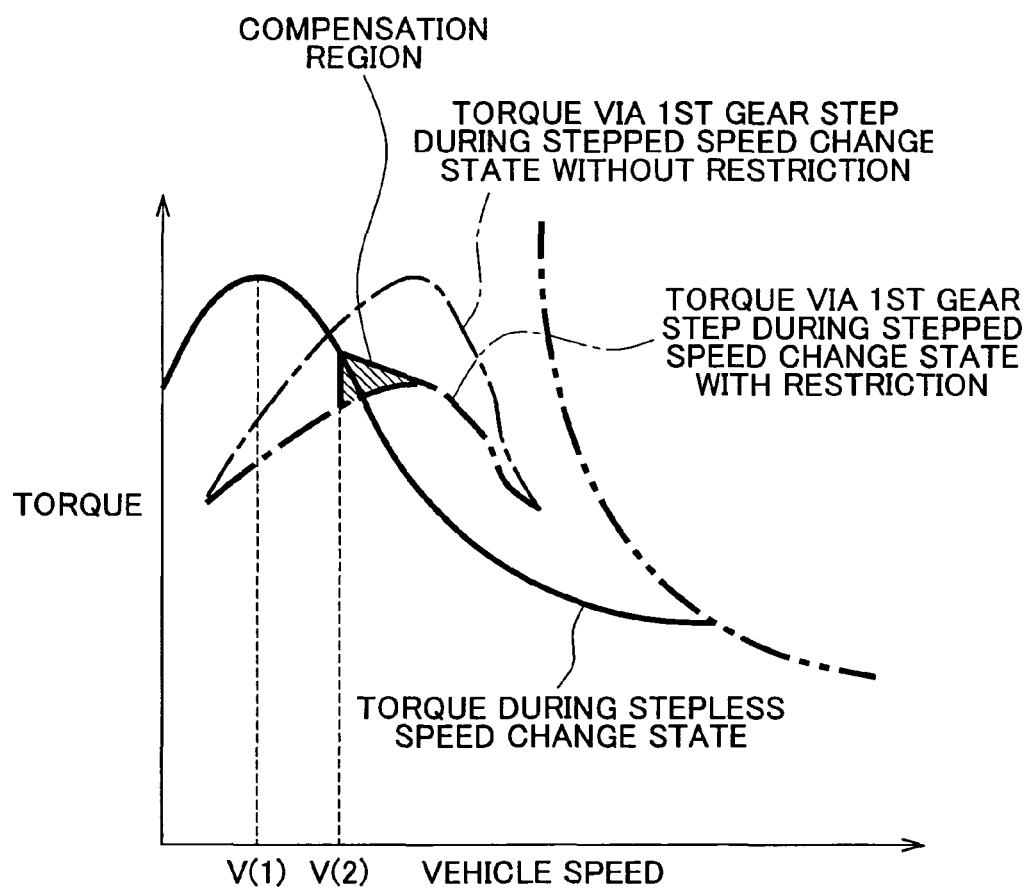
FIG. 9 is a diagram showing the torque transmitted to the rear wheels during a stepless speed change state, and the torque transmitted to the rear wheels during a stepped speed change state (diagram No. 3 of the kind)

For example, as shown in FIG. 9, the engine 100 is controlled so that in the case where the compensation amount of torque is restricted, the peak of the torque transmitted from the engine 100 to the rear wheels 700 following the shifting, that is, the torque transmitted to the rear wheels 700 finally following the shifting, is smaller than in the case where the compensation amount of torque is not restricted.

The change characteristic of the torque transmitted from the engine 100 to the rear wheels 700 following the shifting is determined in accordance with the degree of the restriction of the output torque of the first MG 311 and the second MG 312, that is, the degree of the restriction of the compensation amount of torque.

For example, the toque change characteristic is determined so that in the case where the degree of the restriction of the output torque of the first MG 311 and the second MG 312 is small, the peak of the torque transmitted from the engine 100 to the rear wheels 700 following the shifting is larger than in the case where the degree of the restriction of the output torque of the first MG 311 and the second MG 312 is large. That is, the engine 100 is controlled so that the larger the maximum value of the output torque of the first MG 311 and the second MG 312, the larger the peak of the torque transmitted from the engine 100 to the rear wheels 700 following the shifting.

The electrical stepless speed change portion 846 controls the first MG 311 and the second MG 312 so that the electrical stepless speed change is performed during the stepless speed change state. During the electrical stepless speed change, the speed change ratio in the first speed change portion is steplessly changed through the use of the first MG 311 and the second MG 312 so as to satisfy a target output torque of the transmission 200 calculated from, for example, the accelerator operation amount, the vehicle speed, etc., and so as to realize optimum fuel economy of the engine 100.

Figure 10:
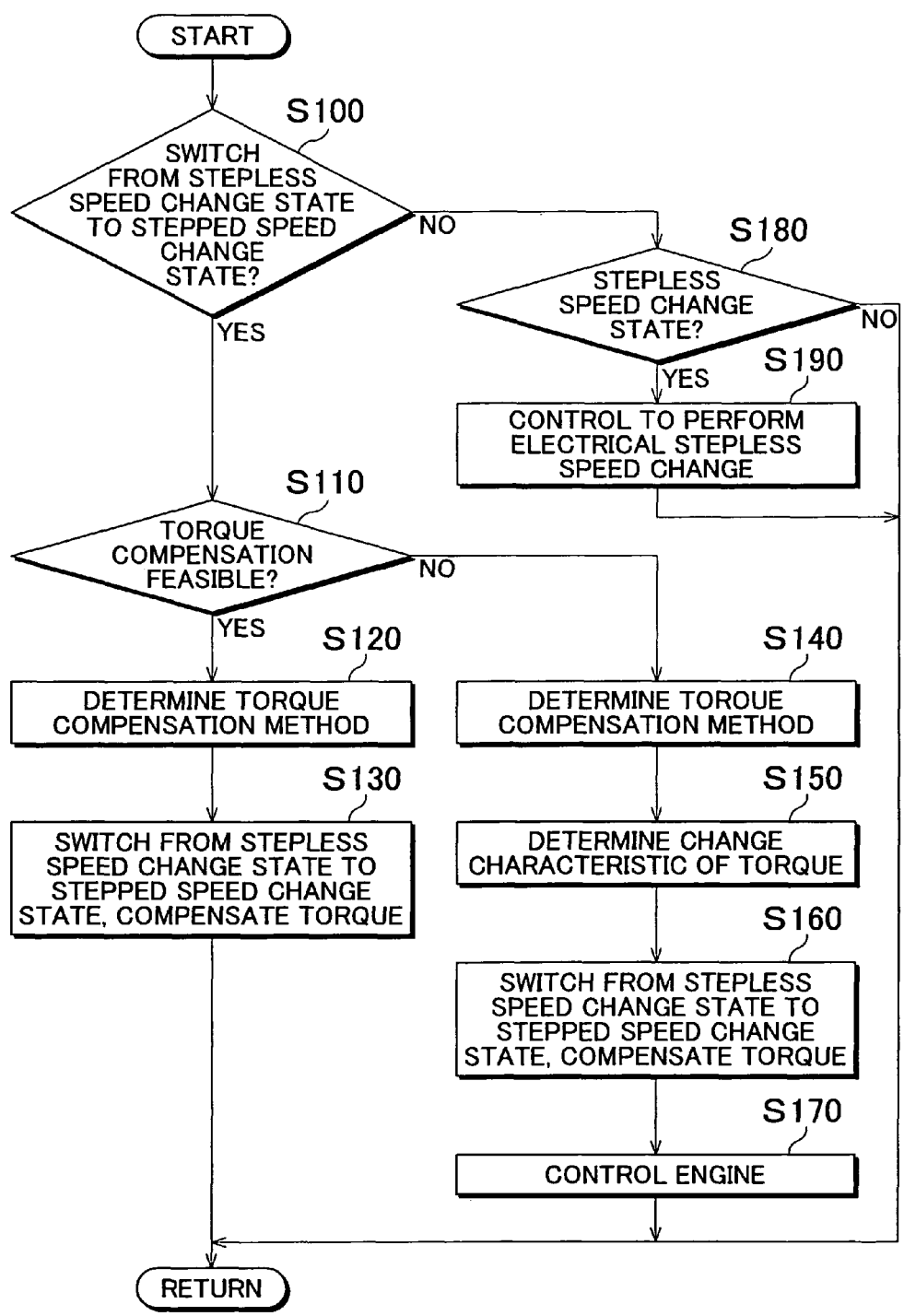
FIG. 10 is a flowchart showing a control structure of a program executed by the ECU.

With reference to FIG. 10, a control structure of a program executed by the ECU 800, that is, the control device in accordance with the embodiment, will be described. Incidentally, the program described below is repeatedly executed at every predetermined cycle.

In step (hereinafter, abbreviated as "S") 100, the ECU 800 determines whether or not the present situation is a situation in which the speed change state is to be switched from the stepless speed change state to the stepped speed change state at the time of an acceleration with the accelerator operation amount increased to a maximum. Whether to switch from the stepless speed change state to the stepped speed change state is determined on the basis of the foregoing shifting chart shown in FIG. 4.

Incidentally, the switching from the stepless speed change state to the stepped speed change state includes prohibiting relative rotation of the sun gear 322, the carrier 326 and the ring gear 328 by engaging the C0 clutch 314, and also includes fixing the sun gear 322 to the case 202 by engaging the B0 brake 316. If the present situation is a situation in which the speed change state is to be switched from the stepless speed change state to the stepped speed change state (YES in S100), the process proceeds to S110. If the present situation is not such a situation (NO in S100), the process proceeds to S180.

In S110, the ECU 800 determines whether or not the torque compensation by the first MG 311 or the second MG 312, that is, torque assist, is feasible. If the output torque of the first MG 311 and the second MG 312 is not restricted, it is determined that the torque compensation by the first MG 311 or the second MG 312 is feasible.

If the torque compensation by the first MG 311 or the second MG 312 is feasible (YES in S110), the process proceeds to S120. If the torque compensation is not feasible (NO in S110), the process proceeds to S140.

In S120, the ECU 800 determines a method of torque compensation. For example, the ECU 800 selects one of a method in which torque is compensated so that the same amount of torque as the torque transmitted to the rear wheels 700 prior to the shifting is continuously transmitted to the rear wheels 700 following the shifting, and a method in which torque is compensated so that the torque transmitted to the rear wheels 700 gradually decreases.

In S130, the ECU 800 performs the switching from the stepless speed change state to the stepped speed change state, and also performs the torque compensation by the first MG 311 or the second MG 312 using the selected method.

In S140, the ECU 800 determines a method of torque compensation in the case where the output torque of the first MG 311 and the second MG 312 is restricted. That is, the vehicle speed at which the switching from the stepless speed change state to the stepped speed change state is performed is determined.

In S150, the ECU 800 determines the change characteristic of the torque transmitted from the engine 100 to the rear wheels 700 following the switching from the stepless speed change state to the stepped speed change state. For example, the change characteristic of the torque is determined so that in the case where the degree of the restriction of the output torque of the first MG 311 and the second MG 312 is small, the peak of the torque transmitted from the engine 100 to the rear wheels 700 following the shifting is larger than in the case where the degree of the restriction thereof is large.

In S160, the ECU 800 performs the switching from the stepless speed change state to the stepped speed change state at the determined vehicle speed, and also performs the torque compensation within the restriction of the first MG 311 or the second MG 312. In S170, the ECU 800 controls the engine 100 so that the change characteristic of the torque transmitted from the engine 100 to the rear wheels 700 becomes the same as the determined change characteristic.

In S180, the ECU 800 determines whether or not the transmission 200 is in the stepless speed change state. Whether the transmission 200 is in the stepless speed change state is determined on the basis of the above-described shifting chart shown in FIG. 4. If the transmission 200 is in the stepless speed change state (YES in S180), the process proceeds to S190. If it is not in the stepless speed change state (NO in S180), this process ends.

In S190, the ECU 800 controls the first MG 311 and the second MG 312 so as to perform the electrical stepless speed change.

An operation of the ECU 800, which is the control device in accordance with the embodiment, on the basis of the structure and the flowchart described above will be described.

If the present situation is a situation in which the speed change state is switched from the stepless speed change state to the stepped speed change state at the time of an acceleration with the accelerator operation amount increased to a maximum (YES in S100), it is determined whether or not the torque compensation by the first MG 311 or the second MG 312 is feasible (S110).

If the torque compensation by the first MG 311 or the second MG 312 is feasible (YES in S110), the method of torque compensation to be employed is determined (or selected) (S120). Let it assumed herein that the method in which torque is compensated so that the same amount of torque as the torque transmitted to the rear wheels 700 prior to the shifting is transmitted to the rear wheels 700 following the shifting is determined (or selected).

Figure 11:
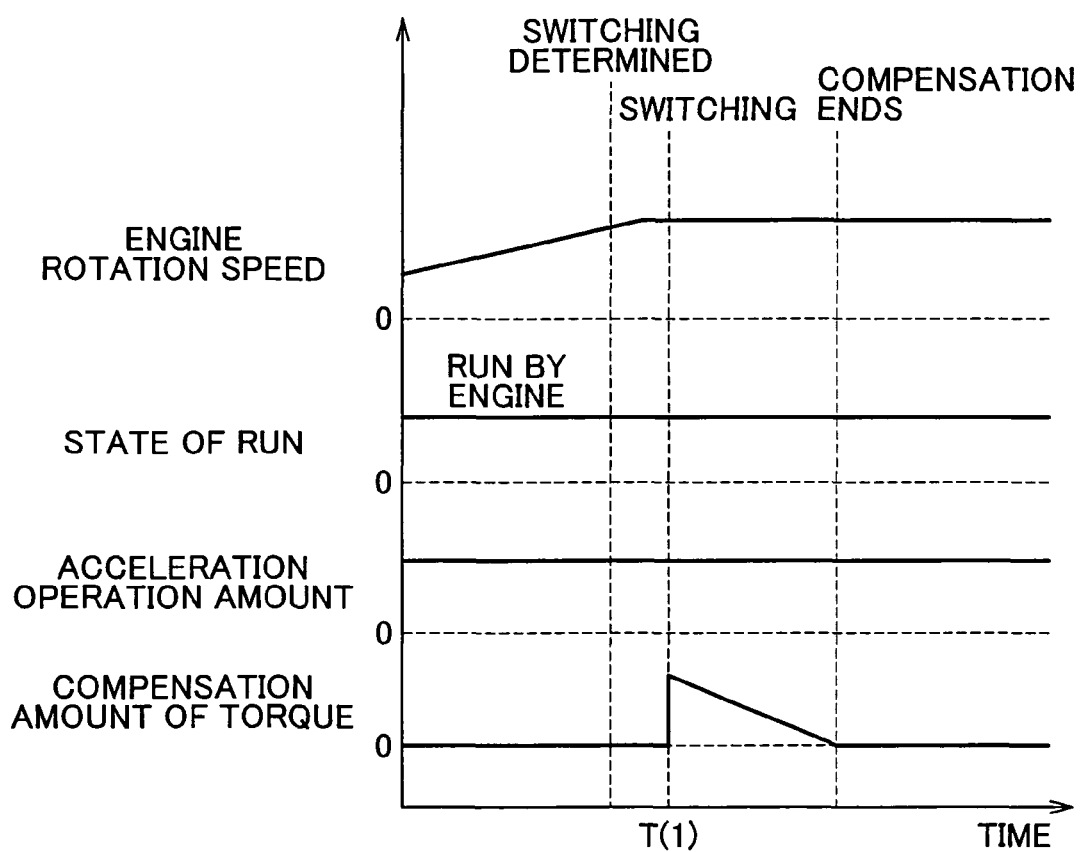
FIG. 11 is a timing chart showing the timing of switching from the stepless speed change state to the stepped speed change state, and the timing of starting torque compensation.

In this case, at a time T(1) shown in FIG. 11, the switching from the stepless speed change state to the stepped speed change state is performed, and torque is compensated so that the same amount of torque as the torque transmitted to the rear wheels 700 prior to the shifting is continuously transmitted to the rear wheels 700 following the shifting as shown in FIG. 8 (S130). Therefore, the continuity of torque is maintained.

On the other hand, if the output torque of the first MG 311 and the second MG 312 is restricted and therefore the torque compensation thereof is not feasible (NO in S110), the method of torque compensation employed in the case where the output torque of the first MG 311 and the second MG 312 is restricted is determined (or selected) (S140). Specifically, the vehicle speed at which the speed change state is switched from the stepless speed change state to the stepped speed change state is determined. Furthermore, the change characteristic of the torque transmitted from the engine 100 to the rear wheels 700 following the switching from the stepless speed change state to the stepped speed change state is determined (S150).

As shown in FIG. 9 described above, at the determined vehicle speed, the switching from the stepless speed change state to the stepped speed change state is performed, and the torque compensation is performed within the range of the restriction of the first MG 311 or the second MG 312 (S160). Furthermore, the engine 100 is controlled so that the change characteristic of the torque transmitted from the engine 100 to the rear wheels 700 becomes the same as the determined change characteristic (S170).

That is, the switching from the stepless speed change state to the stepped speed change state is performed while a torque that is lower than the torque transmitted at the time of the switching from the stepless speed change state to the stepped speed change state in the case where the output torque of the first MG 311 and the second MG 312 is not restricted is being transmitted to the rear wheels 700. Furthermore, the torque transmitted to the rear wheels 700 finally following the switching is made small.

As a result of this, in the case where the output torque of the first MG 311 and the second MG 312 is restricted, that is, in the case where the compensation amount of torque is restricted, the amount of torque that is to be delivered to the wheels by the compensation of torque is made small. Therefore, even in the case where the compensation amount of torque cannot be made large, the continuity of the torque transmitted to the rear wheels 700 is maintained.

In the meantime, if the transmission 200 is in the stepless speed change state (YES in S180), the first MG 311 and the second MG 312 are controlled so as to perform the electrical stepless speed change. As a result, the speed change ratio of the first speed change portion 300 is steplessly changed. Therefore, the torque transmitted to the rear wheels 700 continuously changes.

As described above, according to the ECU that is the control device in accordance with the embodiment, when the switching from the stepless speed change state to the stepped speed change state is performed, the first MG or the second MG is controlled so as to compensate for the amount of change in the torque transmitted to the rear wheels. Therefore, the continuity of torque is maintained.

Figure 12:
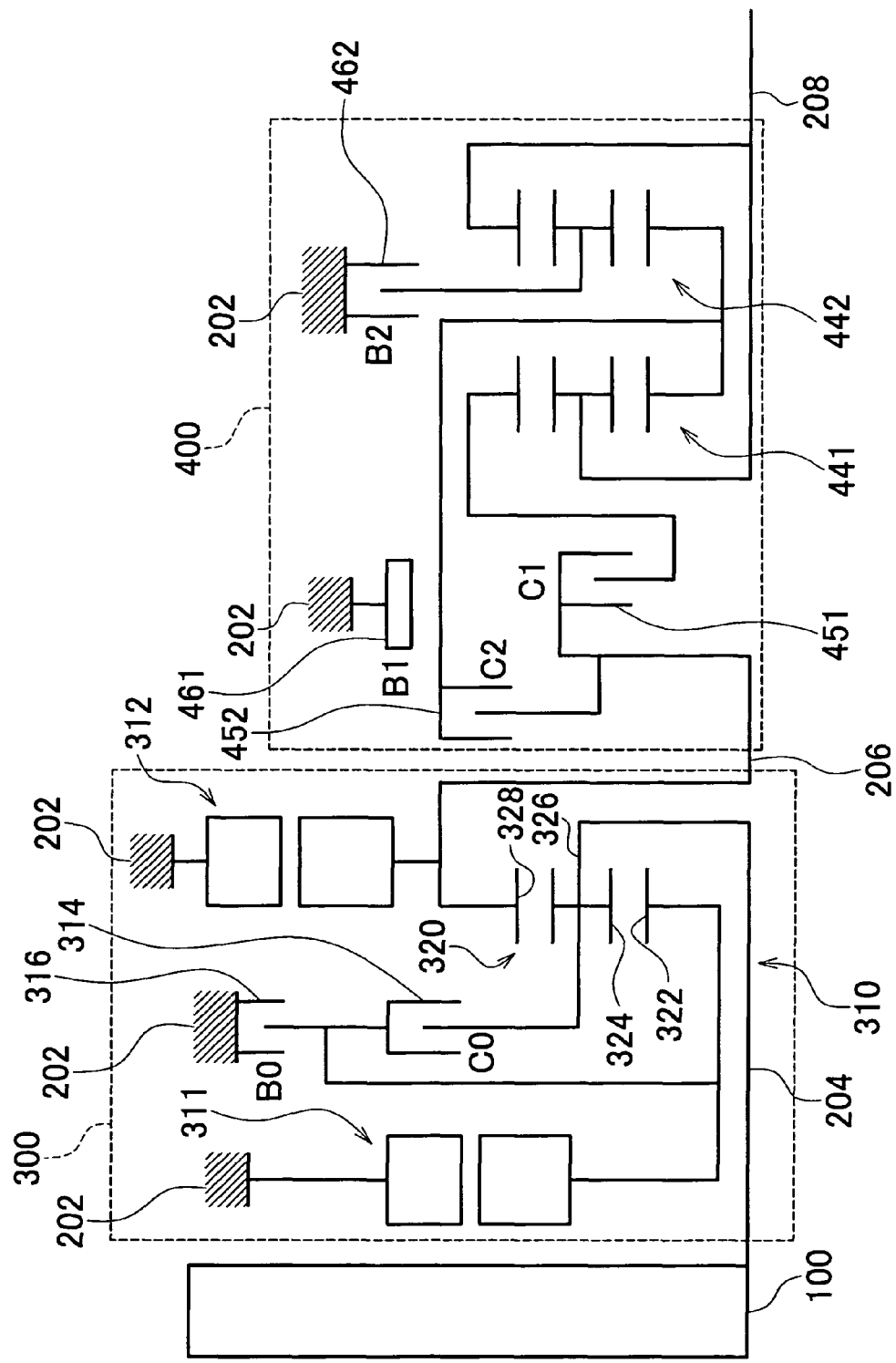
FIG. 12 is a diagram showing a transmission (diagram No. 2 of the kind)

Incidentally, instead of forming five forward speed gear steps, the transmission 200 may form four forward speed gear steps, that is, the first through fourth speed gear steps. In the case where the transmission 200 is constructed so as to form four forward speed gear steps, the second speed change portion 400, as shown in FIG. 12, includes two planetary gears 441, 442 of a single-pinion type, and four friction engagement elements: a C1 clutch 451, a C2 clutch 452, a B1 brake 461 and a B2 brake 462. By engaging the friction engagement elements in combinations shown in an operation table shown in FIG. 13, the four forward speed gear steps, that is, the first through fourth speed gear steps, are formed.

Figures 13, 14:
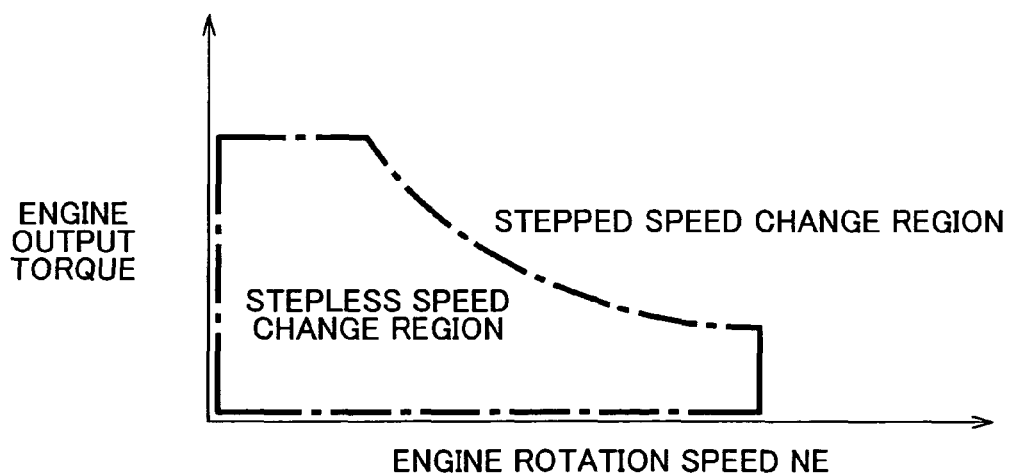
FIG. 13 is a diagram showing an operation table (diagram No. 2 of the kind)
FIG. 14 is a diagram showing control regions of the stepless speed change state and the stepped speed change state.

Furthermore, instead of switching between the stepless speed change state and the stepped speed change state on the basis of the switching line determined in the shifting chart, the switching between the stepless speed change state and the stepped speed change state may be performed on the basis of a map that has as parameters the output torque of the engine 100 and the engine rotation speed NE as shown in FIG. 14.

The amount of change in the torque transmitted to the rear wheels 700 may also be compensated for at the time of the shifting (an upshift in particular) during the stepped speed change state, in addition to the shifting in which the speed change state is switched from the stepless speed change state to the stepped speed change state. Besides, at the time of switching from the stepped speed change state to the stepless speed change state, the amount of change in the torque transmitted to the rear wheels 700 may also be compensated for.

Figure 15:
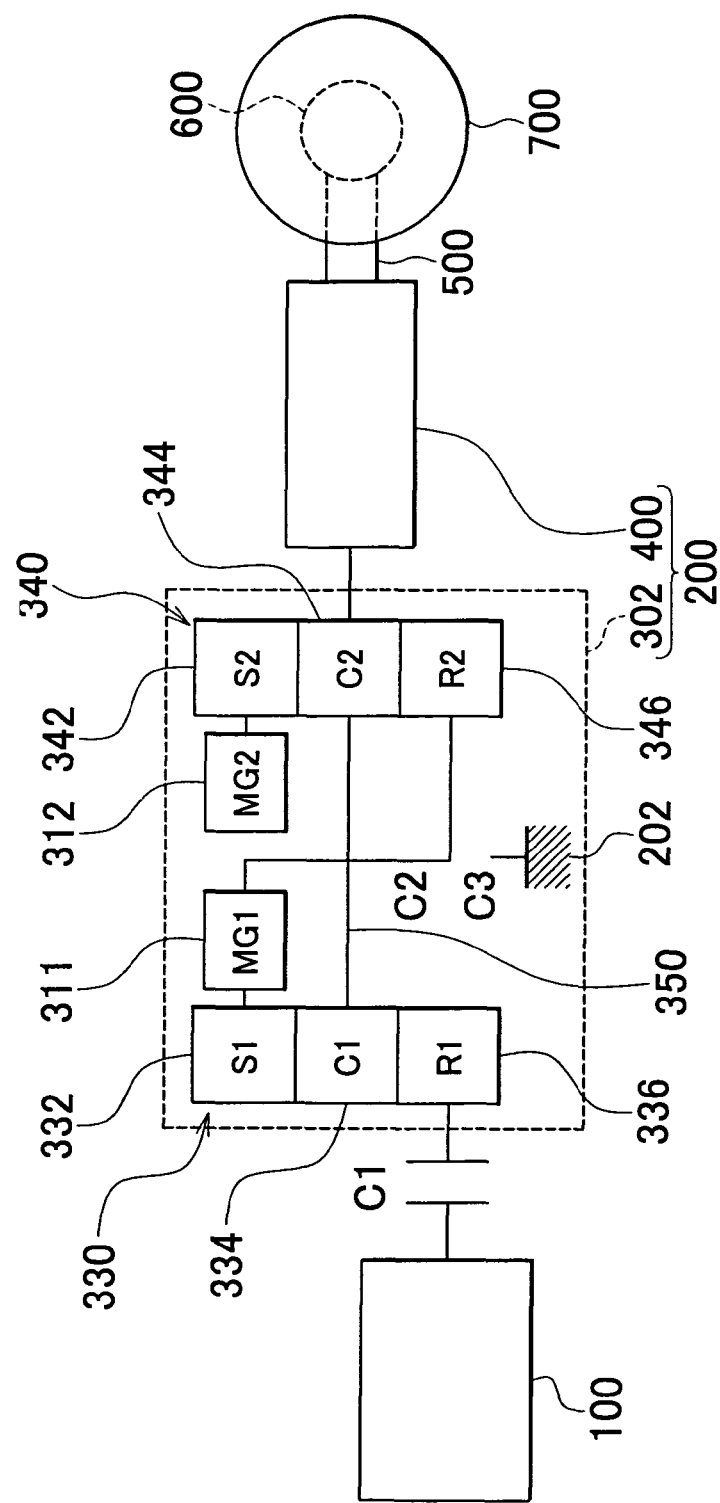
FIG. 15 is a diagram showing a transmission (diagram No. 3 of the kind).

Furthermore, as shown in FIG. 15, the first speed change portion 302 may be constructed of two planetary gears 330, 340. The first MG 311 is linked to a sun gear 332 of the planetary gear 330. The second MG 312 is linked to a sun gear 342 of the other planetary gear 340. A carrier 334 of the planetary gear 330 and a carrier 344 of the planetary gear 340 are interlinked by a shaft 350.

A ring gear 336 of the planetary gear 330 is linked to the engine 100 via a clutch. A ring gear 346 of the planetary gear 340 is linked to the first MG 311 or the case 202 via a clutch.

Incidentally, this construction may also be provided with, for example, a clutch that prohibits or permits relative rotation of the sun gear 342 and the carrier 344 of the planetary gear 340. Furthermore, a brake that unrotatably fixes at least one of the sun gear 332 and the ring gear 336 of the planetary gear 330 and the sun gear 342 of the planetary gear 340 may also be provided.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A control device for a power train including a differential mechanism that has a first rotating element linked to a first rotary electric machine, a second rotating element linked to a second rotary electric machine and a third rotating element linked to an internal combustion engine, a switching mechanism that, in the differential mechanism, switches between a first state that permits relative rotation of the first rotating element, the second rotating element and the third rotating element, and a second state that prohibits relative rotation of the first rotating element, the second rotating element and the third rotating element and a transmission mechanism that is connected to the differential mechanism and that transmits torque input from the differential mechanism to a wheel, the control device comprising:

a power train control portion that controls the power train so as to steplessly change a speed change ratio during the first state;

a transmission mechanism control portion that controls the transmission mechanism so as to stepwise change the speed change ratio during the second state;

a first control portion that controls the switching mechanism so as to switch between the first state and the second state; and a second control portion that controls at least one of the first rotary electric machine and the second rotary electric machine to compensates for an amount of reduction in torque transmitted to the wheel when switching between the first state and the second state is performed, wherein the power train control portion controls the power train so as to cause the torque transmitted to the wheel following the switching between the first state and the second state to be smaller when a compensation amount of the torque transmitted to the wheel is restricted than when the compensation amount is not restricted.

2. The control device according to claim 1, wherein the first control portion includes a portion that controls the switching mechanism so as to switch between the first state and the second state, with the torque transmitted to the wheel being a largest.

3. The control device according to claim 1, wherein the second control portion includes a portion that controls at least one of the first rotary electric machine and the second rotary electric machine so as to compensate for the amount of reduction in the torque by a compensation amount depending on a vehicle speed.

4. The control device according to claim 1, wherein the first control portion includes a portion that controls the switching mechanism so as to switch between the first state and the second state after changing a condition for switching between the first state and the second state.

5. The control device according to claim 1, wherein the second control portion includes a portion that controls at least one of the first rotary electric machine and the second rotary electric machine so as to compensate for the amount of reduction in the torque transmitted to the wheel when switching between the first state and the second state is performed.

6. A control device for a power train including a differential mechanism that has a first rotating element linked to a first rotary electric machine, a second rotating element linked to a second rotary electric machine and a third rotating element linked to an internal combustion engine, a switching mechanism that, in the differential mechanism, switches between a first state that permits relative rotation of the first rotating element, the second rotating element and the third rotating element, and a second state in which at least one of the first rotating element, the second rotating element and the third rotating element is fixed, and a transmission mechanism that is connected to the differential mechanism and that transmits torque input from the differential mechanism to a wheel, the control device comprising:

a power train control portion that controls the power train so as to steplessly change a speed change ratio during the first state;

a transmission mechanism control portion that controls the transmission mechanism so as to stepwise change the speed change ratio during the second state;

a first control portion that controls the switching mechanism so as to switch between the first state and the second state; and a second control portion that controls at least one of the first rotary electric machine and the second rotary electric machine to compensate for an amount of reduction in torque transmitted to the wheel when switching between the first state and the second state is performed, wherein the power train control portion controls the power train so as to cause the torque transmitted to the wheel following the switching between the first state and the second state to be smaller when a compensation amount of the torque transmitted to the wheel is restricted than when the compensation amount is not restricted.

7. The control device according to claim 6, wherein the first control portion includes a portion that controls the switching mechanism so as to switch between the first state and the second state after changing a condition for switching between the first state and the second state.

8. The control device according to claim 6, wherein the second control portion includes a portion that controls at least one of the first rotary electric machine and the second rotary electric machine so as to compensate for the amount of reduction in the torque transmitted to the wheel when switching between the first state and the second state is performed.

9. The control device according to claim 6, wherein the first control portion includes a portion that controls the switching mechanism so as to switch between the first state and the second state, with the torque transmitted to the wheel being a largest.

10. The control device according to claim 6, wherein the second control portion includes a portion that controls at least one of the first rotary electric machine and the second rotary electric machine so as to compensate for the amount of reduction in the torque by a compensation amount depending on a vehicle speed.

11. A control device for a power train including a differential mechanism that has a first rotating element linked to a first rotary electric machine, a second rotating element linked to a second rotary electric machine and a third rotating element linked to an internal combustion engine, a switching mechanism that, in the differential mechanism, switches between a first state that permits relative rotation of the first rotating element, the second rotating element and the third rotating element, and a second state that prohibits relative rotation of the first rotating element, the second rotating element and the third rotating element, and a transmission mechanism that is connected to one of the first rotating element, the second rotating element and the third rotating element and that transmits torque input from one of the first rotating element, the second rotating element and the third rotating element to a wheel, the control device comprising:

a power train control portion that controls the power train so as to steplessly change a speed change ratio during the first state;

a transmission mechanism control portion that controls the transmission mechanism so as to stepwise change the speed change ratio during the second state;

a first control portion that controls the switching mechanism so as to switch between the first state and the second state; and a second control portion that controls at least one of the first rotary element and the second rotary element to compensate for an amount of reduction in torque transmitted to the wheel when switching between the first state and the second state is performed, wherein the power train control portion controls the power train so as to causes the torque transmitted to the wheel following the switching between the first state and the second state to be smaller when a compensation amount of the torque transmitted to the wheel is restricted than when the compensation amount is not restricted.

12. The control device according to claim 11, wherein the first control portion includes a portion that controls the switching mechanism so as to switch between the first state and the second state after changing a condition for switching between the first state and the second state.

13. The control device according to claim 11, wherein the second control portion includes a portion that controls at least one of the first rotary electric machine and the second rotary electric machine so as to compensate for the amount of reduction in the torque transmitted to the wheel when switching between the first state and the second state is performed.

14. A control device for a power train including a differential mechanism that has a first rotating element linked to a first rotary electric machine, a second rotating element linked to a second rotary electric machine and a third rotating element linked to an internal combustion engine, a switching mechanism that, in the differential mechanism, switches between a first state that permits relative rotation of the first rotating element, the second rotating element and the third rotating element, and a second state that prohibits relative rotation of the first rotating element, the second rotating element and the third rotating element and a transmission mechanism that is connected to the differential mechanism and that transmits torque input from the differential mechanism to a wheel, the control device comprising:

a power train control portion that controls the power train so as to steplessly change a speed change ratio during the first state;

a transmission mechanism control portion that controls the transmission mechanism so as to stepwise change the speed change ratio during the second state;

a first control portion that controls the switching mechanism so as to switch between the first state and the second state; and a second control portion that controls at least one of the first rotary electric machine and the second rotary electric machine to compensate for an amount of reduction in torque transmitted to the wheel when switching between the first state and the second state is performed, wherein the first control portion includes a portion that, when the compensation amount of the torque transmitted to the wheel is restricted, controls the switching mechanism so as to perform the switching between the first state and the second state, with the torque transmitted to the wheel being different from the torque transmitted to the wheel at a time of the switching between the first state and the second state when the compensation amount is not restricted.

15. The control device according to claim 14, wherein the first control portion includes the portion that, when the compensation amount of the torque transmitted to the wheel is restricted, controls the switching mechanism so as to perform the switching between the first state and the second state, with the torque transmitted to the wheel being smaller than the torque transmitted to the wheel at a time of the switching between the first state and the second state when the compensation amount is not restricted.

16. A control device for a power train including a differential mechanism that has a first rotating element linked to a first rotary electric machine, a second rotating element linked to a second rotary electric machine and a third rotating element linked to an internal combustion engine, a switching mechanism that, in the differential mechanism, switches between a first state that permits relative rotation of the first rotating element, the second rotating element and the third rotating element, and a second state in which at least one of the first rotating element, the second rotating element and the third rotating element is fixed, and a transmission mechanism that is connected to the differential mechanism and that transmits torque input from the differential mechanism to a wheel, the control device comprising:
   a power train control portion that controls the power train so as to steplessly change a speed change ratio during the first state;
   a transmission mechanism control portion that controls the transmission mechanism so as to stepwise change the speed change ratio during the second state;
   a first control portion that controls the switching mechanism so as to switch between the first state and the second state; and
   a second control portion that controls at least one of the first rotary electric machine and the second rotary electric machine to compensate for an amount of reduction in torque transmitted to the wheel when switching between the first state and the second state is performed,
   wherein the first control portion includes a portion that, when the compensation amount of the torque transmitted to the wheel is restricted, controls the switching mechanism so as to perform the switching between the first state and the second state, with the torque transmitted to the wheel being different from the torque transmitted to the wheel at a time of the switching between the first state and the second state when the compensation amount is not restricted.

17. The control device according to claim 16, wherein the first control portion includes the portion that, when the compensation amount of the torque transmitted to the wheel is restricted, controls the switching mechanism so as to perform the switching between the first state and the second state, with the torque transmitted to the wheel being smaller than the torque transmitted to the wheel at a time of the switching between the first state and the second state when the compensation amount is not restricted.

18. A control device for a power train including a differential mechanism that has a first rotating element linked to a first rotary electric machine, a second rotating element linked to a second rotary electric machine and a third rotating element linked to an internal combustion engine, a switching mechanism that, in the differential mechanism, switches between a first state that permits relative rotation of the first rotating element, the second rotating element and the third rotating element, and a second state that prohibits relative rotation of the first rotating element, the second rotating element and the third rotating element, and a transmission mechanism that is connected to one of the first rotating element, the second rotating element and the third rotating element and that transmits torque input from one of the first rotating element, the second rotating element and the third rotating element to a wheel, the control device comprising:
   a power train control portion that controls the power train so as to steplessly change a speed change ratio during the first state;
   a transmission mechanism control portion that controls the transmission mechanism so as to stepwise change the speed change ratio during the second state;
   a first control portion that controls the switching mechanism so as to switch between the first state and the second state; and
   a second control portion that controls at least one of the first rotary electric machine and the second rotary electric machine to compensate for an amount of reduction in torque transmitted to the wheel when switching between the first state and the second state is performed,
   wherein the first control portion includes a portion that, when the compensation amount of the torque transmitted to the wheel is restricted, controls the switching mechanism so as to perform the switching between the first state and the second state, with the torque transmitted to the wheel being different from the torque transmitted to the wheel at a time of the switching between the first state and the second state when the compensation amount is not restricted.

19. The control device according to claim 18, wherein the first control portion includes the portion that, when the compensation amount of the torque transmitted to the wheel is restricted, controls the switching mechanism so as to perform the switching between the first state and the second state, with the torque transmitted to the wheel being smaller than the torque transmitted to the wheel at a time of the switching between the first state and the second state when the compensation amount is not restricted.

* * * * *

UNITED STATES PATENT AND TRADEMARK OFFICE
CERTIFICATE OF CORRECTION

PATENT NO.         : 7,794,357 B2
APPLICATION NO.    : 12/068948
DATED              : September 14, 2010
INVENTOR(S)        : Tatsuya Imamura et al.

It is certified that error appears in the above-identified patent and that said Letters Patent is hereby corrected as shown below:

|         | Column | Line |   |
|---------|--------|------|---|
|         | 3      | 30   | Change "is a largest" to --is at a maximum--. |
|         | 8      | 52   | Change "toque" to --torque--. |
|         | 12     | 25   | Change "let it assumed" to --let it be assumed--. |
| Claim 2 | 14     | 43   | Change "a portion" to --the portion--. |
| Claim 2 | 14     | 45   | Change "being a" to --being at--. |
| Claim 2 | 14     | 46   | Change "largest" to --a maximum--. |
| Claim 3 | 14     | 48   | Change "a portion" to --the portion--. |
| Claim 4 | 14     | 54   | Change "a portion" to --the portion--. |
| Claim 5 | 14     | 59   | Change "a portion" to --the portion--. |
| Claim 7 | 15     | 33   | Change "a portion" to --the portion--. |
| Claim 8 | 15     | 38   | Change "a portion" to --the portion--. |
| Claim 9 | 15     | 44   | Change "a portion" to --the portion--. |
| Claim 12| 16     | 24   | Change "a portion" to --the portion--. |
| Claim 13| 16     | 29   | Change "a portion" to --the portion--. |

Signed and Sealed this
Fifteenth Day of March, 2011

David J. Kappos
*Director of the United States Patent and Trademark Office*